(12) United States Patent
Myung et al.

(10) Patent No.: US 11,101,459 B2
(45) Date of Patent: Aug. 24, 2021

(54) ELECTRODE MATERIAL FOR ZINC SECONDARY BATTERIES

(71) Applicant: INDUSTRY-ACADEMIA COOPERATION GROUP OF SEJONG UNIVERSITY, Seoul (KR)

(72) Inventors: Seung Taek Myung, Seoul (KR); Jae Hyeon Jo, Seoul (KR); Hee Jae Kim, Seoul (KR)

(73) Assignee: INDUSTRY-ACADEMIA COOPERATION GROUP OF SEJONG UNIVERSITY, Seoul (KR)

(*) Notice: Subject to any disclaimer, the term of this patent is extended or adjusted under 35 U.S.C. 154(b) by 3 days.

(21) Appl. No.: 16/222,439

(22) Filed: Dec. 17, 2018

(65) Prior Publication Data

US 2020/0091504 A1  Mar. 19, 2020

(30) Foreign Application Priority Data

Sep. 18, 2018 (KR) ......................... 10-2018-0111762
Dec. 17, 2018 (KR) ......................... 10-2018-0163512

(51) Int. Cl.
*H01M 4/36* (2006.01)
*H01M 4/485* (2010.01)
(Continued)

(52) U.S. Cl.
CPC .......... *H01M 4/366* (2013.01); *H01M 4/485* (2013.01); *H01M 10/054* (2013.01); *H01M 2004/028* (2013.01)

(58) Field of Classification Search
None
See application file for complete search history.

(56) References Cited

U.S. PATENT DOCUMENTS

2002/0037455 A1* 3/2002 Tani ..................... H01M 4/624
429/223
2012/0321953 A1 12/2012 Chen et al.

FOREIGN PATENT DOCUMENTS

KR 10-2018-0102505 A 9/2018

OTHER PUBLICATIONS

Yangsheng Cai et al, "Pilotaxitic Na1.1V3O7.9 nanoribbons/graphene as high-performance sodium ion battery and aqueous zinc ion battery cathode", Energy Storage Materials, 2018, vol. 13, doi:10.1016/j.ensm.2018.01.009, ISSN 2405-8297, pp. 168-174.

(Continued)

*Primary Examiner* — Carmen V Lyles-Irving
(74) *Attorney, Agent, or Firm* — Sughrue Mion, PLLC (57) ABSTRACT

Disclosed is a zinc ion secondary battery. More particularly, the zinc ion secondary battery includes a first electrode; a second electrode; and an electrolyte disposed between the first electrode and the second electrode, wherein an active material included in the first electrode is an alkali metal-vanadium oxide/graphene oxide composite, wherein the alkali metal-vanadium oxide has a layered structure in which alkali metal layers and vanadium oxide layers are alternately stacked. Accordingly, a zinc ion battery system including the $K_2V_3O_8$/a graphene oxide composite as an electrode active material can exhibit excellent rechargeability and have a high discharge capacity and an excellent capacity retention rate.

15 Claims, 8 Drawing Sheets

(51) Int. Cl.
*H01M 10/054* (2010.01)
*H01M 4/02* (2006.01)

(56) References Cited

OTHER PUBLICATIONS

Dongliang Chao et al, "A High-Rate and Stable Quasi-Solid-State Zinc-Ion Battery with Novel 2D Layered Zinc Orthovanadate Array", Advanced Materials, 2018, vol. 30, No. 32, doi:10.1002/adma.201803181, ISSN 0935-9648, p. 1803181 (7 pages total).
Yakun Lu et al, "Facile Synthesis of Na 0.33V2O5 Nanosheet-Graphene Hybrids as Ultrahigh Performance Cathode Materials for Lithium Ion Batteries", ACS Applied Materials & Interfaces, 2015, vol. 7, No. 31, doi:10.1021/acsami.5b04827, ISSN 1944-8244, pp. 17433-17440.
Muhammad H. Alfaruqi et al, "Electrochemical Zinc Intercalation in Lithium Vanadium Oxide: A High-Capacity Zinc-Ion Battery Cathode", Chemistry of Materials, 2017, vol. 29, No. 4, doi:10.1021/acs.chemmater6b05092, ISSN 0897-4756, pp. 1684-1694.
Dipan Kundu et al, "A high-capacity and long-life aqueous rechargeable zinc battery using a metal oxide intercalation cathode", Nature Energy, 2016, vol. 1, No. 10, doi:10.1038/nenergy.2016.119, XP055616774 (8 pages total).

* cited by examiner

ELECTRODE MATERIAL FOR ZINC SECONDARY BATTERIES

CROSS REFERENCE TO RELATED APPLICATIONS

This application claims priority to Korean Patent Application No. 2018-0111762 filed on Sep. 18, 2018, and No. 2018-0163512 filed on Dec. 17, 2018 in the Korean Intellectual Property Office (KIPO), the entire contents of which are hereby incorporated by reference.

BACKGROUND

1. Technical Field

Example embodiments of the present disclosure relate to a secondary battery and more specifically to a zinc ion secondary battery.

2. Related Art

Secondary batteries refer to batteries capable of being charged/discharged and thus repeatedly used. A lithium secondary battery, as a representative example of secondary batteries, operates by a principle wherein lithium ions included in a positive electrode active material migrate to a negative electrode via an electrolyte and then are intercalated into a layered structure of the negative electrode active material (charging), and then the lithium ions intercalated into the layered structure of the negative electrode active material return to the positive electrode (discharging). Such a lithium secondary battery is currently available and is being used as a small power source of mobile phones, notebooks, and the like. In addition, the lithium secondary battery is expected to be available as a large power source for hybrid cars. Accordingly, demand therefor is expected to increase.

However, since a composite metal oxide mainly used as a positive electrode active material in a lithium secondary battery includes a rare metal element such as lithium, there is a concern that the increased demand might not be met.

Accordingly, research on a sodium secondary battery using sodium, which can be sufficiently supplied and is cheap, as a positive electrode active material was conducted. For example, Korean Patent Application Publication No. 2012-0133300 discloses $A_xMnPO_4F$ (A=Li or Na, $0<x\leq2$) as a positive electrode active material. However, a sodium battery system still has complex stability and environmental problems.

Meanwhile, as various technologies for flexible electronic devices and recently developed wearable electronic devices, have been developed, demand for a secondary battery operated with a material that does not have a risk of explosion and is stable is increasing. With regard to this, a zinc secondary battery has high stability, compared to other secondary batteries, is ecofriendly and non-toxic, and has high economic efficiency, compared to other alkali metal batteries. Accordingly, research on a zinc secondary battery using zinc as a positive electrode active material is actively underway.

However, research on an electrode active material for zinc secondary batteries has not been sufficiently conducted. In addition, extensively studied $MnO_2$-based materials among electrode active materials for zinc secondary batteries have problems that the capacities thereof are reduced and Mn is eluted during a continuous electrochemical reaction.

SUMMARY

Accordingly, example embodiments of the present disclosure are provided to substantially obviate one or more problems due to limitations and disadvantages of the related art.

Example embodiments of the present disclosure provide a novel electrode active material applicable to a zinc ion secondary battery, using an abundant raw material compared to lithium and which is ecofriendly and cheap and has high stability.

In accordance with an aspect of the present disclosure, the above and other objects can be accomplished by the provision of a zinc ion secondary battery. In some example embodiments, a zinc ion secondary battery includes a first electrode; a second electrode; and an electrolyte disposed between the first electrode and the second electrode, wherein an active material included in the first electrode is an alkali metal-vanadium oxide/graphene oxide composite, wherein the alkali metal-vanadium oxide has a layered structure in which alkali metal layers and vanadium oxide layers are alternately stacked.

The alkali metal-vanadium oxide may have a tetragonal crystal structure.

The alkali metal-vanadium oxide may have a P4bm space group.

The layered structure may be formed of a plurality of vanadium oxide layers with corner-sharing tetragonal-pyramidal $VO_5$ and tetrahedral $VO_4$.

The alkali metal-vanadium oxide/graphene oxide composite may include vanadium oxide particles and a reduced graphene oxide sheet for affixing the vanadium oxide particles.

The $M_xV_3O_8$ may be $K_2V_3O_8$.

The graphene oxide may be a reduced graphene oxide.

Zinc ions may be intercalated into or deintercalated from empty spaces between layers in the layered structure.

The alkali metal-vanadium oxide/graphene oxide composite may include vanadium oxide particles and a reduced graphene oxide sheet for fixing the vanadium oxide particles.

In accordance with another aspect of the present disclosure, there is provided an electrode active material. In other example embodiments, an electrode active material is an alkali metal-vanadium oxide/graphene oxide composite including vanadium oxide particles; and a graphene oxide sheet for affixing the vanadium oxide particles, wherein the alkali metal-vanadium oxide has a layered structure in which alkali metal layers and vanadium oxide layers are alternately stacked.

The layered structure may be formed of a plurality of vanadium oxide layers with corner-sharing tetragonal-pyramidal $VO_5$ and tetrahedral $VO_4$.

The alkali metal-vanadium oxide may be $M_xV_3O_8$, wherein M is an alkali metal, and x is 2 to 2.2.

The graphene oxide may be a reduced graphene oxide.

In accordance with still another aspect of the present disclosure, there is provided a method of preparing an electrode active material. In still other example embodiments, a method of preparing an electrode active material includes preparing a solution including a vanadium oxide, an alkali compound, and a solvent; adding a reduced graphene oxide to the solution to prepare a mixture; and performing solvothermal synthesis by feeding the mixture into a closed reactor and heat-treating at a temperature of a boiling point of the solvent or higher.

The solvent may be an anhydrous alcohol. The anhydrous alcohol may be anhydrous ethanol.

The solvothermal synthesis may be performed at 170 to 230° C.

The solvothermal synthesis may be performed for 22 to 26 hours.

BRIEF DESCRIPTION OF DRAWINGS

Example embodiments of the present disclosure will become more apparent by describing in detail example embodiments of the present disclosure with reference to the accompanying drawings, in which.

DESCRIPTION OF EXAMPLE EMBODIMENTS

Hereinafter, the present disclosure will be described in detail by describing exemplary embodiments of the disclosure with reference to the attached drawings. However, the scope of the present disclosure is not limited to the embodiments described in the present specification and may be embodied in other forms.

Active Material for Secondary Batteries

An electrode active material according to an embodiment of the present disclosure may be an alkali metal-vanadium oxide/graphene oxide composite including vanadium oxide particles and a graphene oxide sheet for affixing the vanadium oxide particles. The alkali metal-vanadium oxide may have a layered structure wherein alkali metal layers and vanadium oxide layers are alternately stacked. The layered structure is formed of a plurality of vanadium oxide layers with corner-sharing tetragonal-pyramidal $VO_5$ and tetrahedral $VO_4$. The alkali metal-vanadium oxide has a tetragonal crystal structure and a P4bm space group.

In addition, the alkali metal-vanadium oxide/graphene oxide composite may include vanadium oxide particles and a graphene oxide sheet for affixing the vanadium oxide particles.

Further, the alkali metal-vanadium oxide may be $M_xV_3O_8$, wherein M may be an alkali metal and x may be 2 to 2.2. For example, the $M_xV_3O_8$ may be $M_2V_3O_8$, wherein M may be an alkali metal. More particularly, $M_2V_3O_8$ may be $K_2V_3O_8$.

The graphene oxide may be a reduced graphene oxide.

Figure 1A:
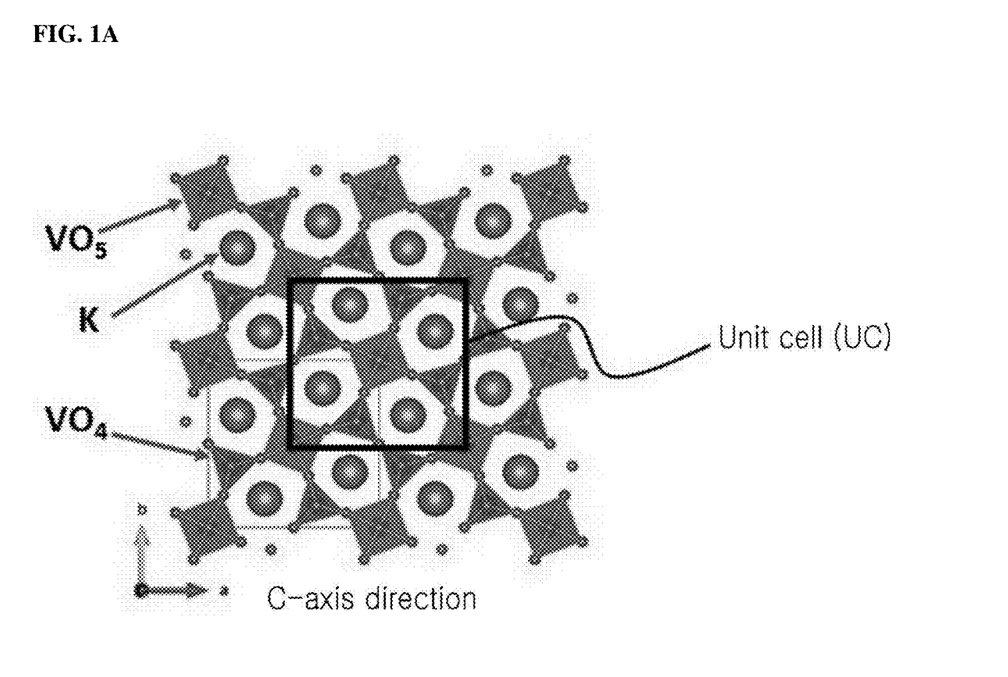
FIGS. 1A and 1B are schematic views illustrating a crystal structure of $K_2V_3O_8$.
Figure 1B:
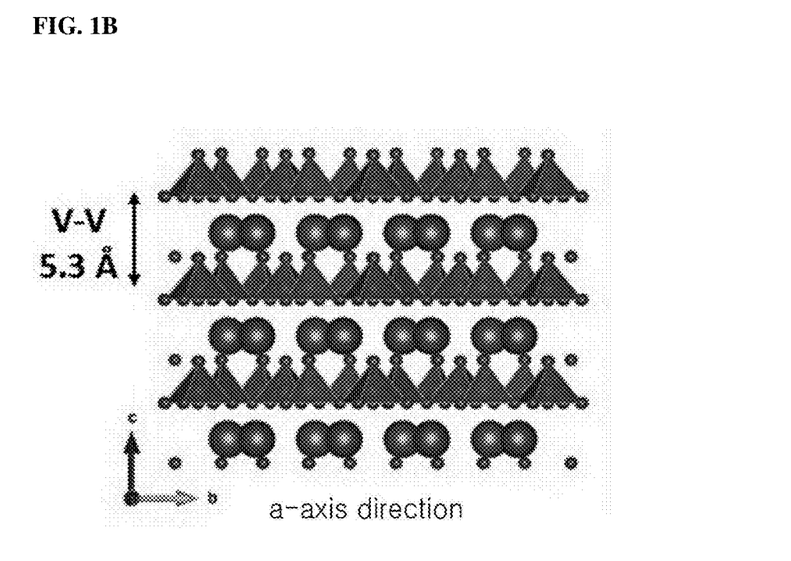

FIGS. 1A and 1B are schematic views illustrating a crystal structure of $K_2V_3O_8$.

Referring to FIGS. 1A and 1B, $K_2V_3O_8$ particles have a crystal structure formed of a plurality of vanadium oxide layers with corner-sharing tetragonal-pyramidal $VO_5$ or tetrahedral $VO_4$. The crystal structure is a layered structure wherein the vanadium oxide layers are arranged in a line, and as potassium layers are disposed between the vanadium oxide layers, the vanadium oxide layers and the potassium layers are alternately stacked. Here, K may function as a pillar.

Here, the structure may have a shape wherein potassium is seen in empty spaces between vanadium oxides when viewed in a c-axis direction.

In addition, the vanadium oxide layer may have a structure wherein tetragonal-pyramidal $VO_5$ is located at the center and vertex of a unit cell (UC) of $K_2V_3O_8$ particles and $VO_4$ is disposed between $VO_5$ at the center of the unit cell and $VO_5$ at the vertex thereof while sharing corners with $VO_5$. In addition, the tetrahedral $VO_4$ may share corners with other tetragonal-pyramidal $VO_5$ located outside the unit cell. That is, such $K_2V_3O_8$ particles may have a tetragonal crystal structure and a P4bm space group.

Figure 5A:
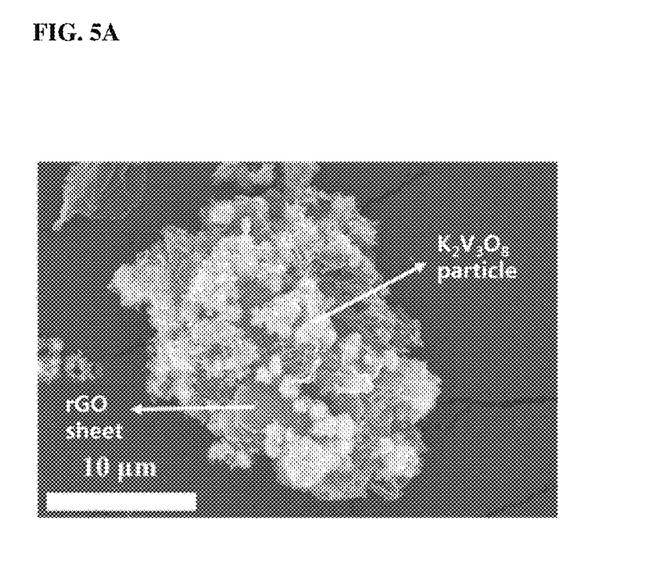
FIGS. 5A and 5B illustrate scanning electron microscopy (SEM) photographs of powders obtained in Manufacturing Example 1 and Comparative Example 1, respectively.
Figure 5B:
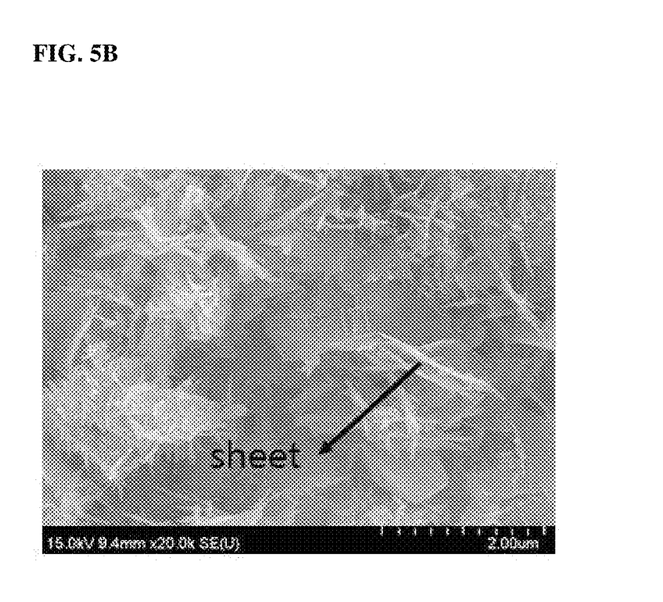

Further, as described in FIG. 5B, the $K_2V_3O_8$ particles may have a shape wherein two-dimensional sheets having a nanometer layer thickness are irregularly agglomerated, voids are present between the sheets, and the surfaces of the particles have a sea urchin shape, whereby a surface area relative to a volume is large. Accordingly, the capacity for ions may be greatly increased.

The $K_2V_3O_8$ particles may be provided as a $K_2V_3O_8$/reduced graphene oxide composite by being fixed affixed on a reduced graphene oxide sheet. That is, the active material according to an embodiment of the present disclosure may be a $K_2V_3O_8$/reduced graphene oxide composite that includes $K_2V_3O_8$ particles and a reduced graphene oxide sheet for affixing the $K_2V_3O_8$ particles. This $K_2V_3O_8$/reduced graphene oxide composite may include $K_2V_3O_8$ particles affixed to or physically bonded to a reduced graphene oxide sheet, as illustrated in FIG. 5A.

The reduced graphene oxide sheet may be manufactured by reducing graphene oxide sheets, from which graphite flakes are peeled off by oxidation and agitation, through heat treatment or chemical treatment and may include several to several tens of graphene layers. Such a reduced graphene oxide sheet may exhibit excellent conductivity compared to other carbon materials although having some oxidized regions and defective regions compared to pure graphene sheets.

Accordingly, the $K_2V_3O_8$ particles are directly connected to the reduced graphene oxide, whereby excellent electrical contact may be formed. In addition, when the $K_2V_3O_8$/reduced graphene oxide composite is applied to a battery electrode, the battery may exhibit excellent rechargeability, cycle stability, and the like, and zinc ions may be advantageously intercalated into or deintercalated from empty spaces between layers of the layered structure. Therefore, the $K_2V_3O_8$ particles may be used as a very efficient material for fast charging and discharging.

The $K_2V_3O_8$ particles may be prepared by the following method.

First, a mixture including a vanadium oxide, an alkali compound, and a solvent was prepared. The mixture was put into a closed reactor and heat-treated at a temperature of a boiling point of the solvent or higher to perform solvothermal synthesis. The synthesized material was filtered, washed, and dried, thereby obtaining the $K_2V_3O_8$ particles.

Figure 2:
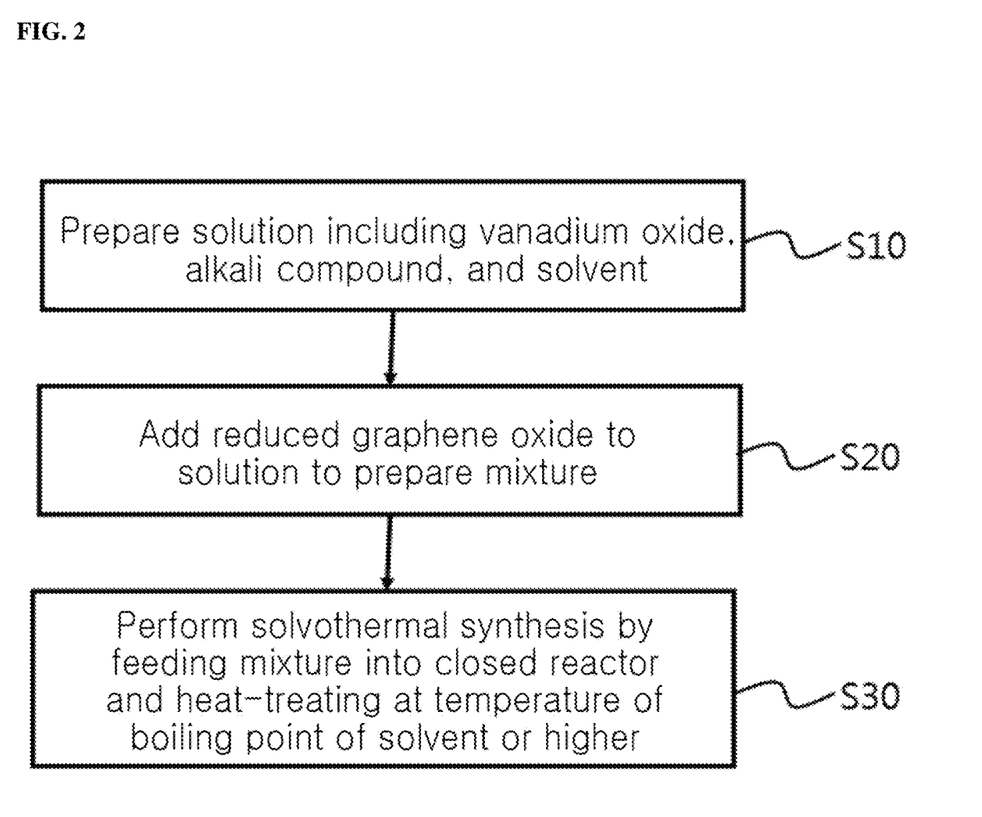
FIG. 2 is a schematic view illustrating a method of manufacturing an electrode active material according to an embodiment of the present disclosure.

FIG. 2 is a schematic view illustrating a method of manufacturing an electrode active material according to an embodiment of the present disclosure.

Referring to FIG. 2, first, a solution including a vanadium oxide, an alkali compound, and a solvent was prepared (S10). A reduced graphene oxide was added to the solution to prepare a mixture (S20). The mixture was put into a closed reactor, and solvothermal synthesis was performed by heat-treating at a temperature of a boiling point of the solvent or higher (S30). The synthesized material was filtered, washed, and dried, thereby obtaining the $M_xV_3O_8$/reduced graphene oxide composite.

In $M_xV_3O_8$, M may be an alkali metal, and x may be 2 to 2.2.

The vanadium oxide may be $V_2O_5$. In addition, the alkali compound may be an alkaline hydroxide. For example, the alkaline hydroxide may be KOH or NaOH.

The solvent included in the mixture may be an alcohol, for example, ethanol. Further, the solvent may be anhydrous alcohol, e.g., absolute ethanol. In addition, the solvent may function as a reducing agent in the solvothermal synthesis step. In particular, when anhydrous ethanol is used, the vanadium oxide may be reduced without use of another reducing agent.

The solvothermal synthesis step may be performed at a higher temperature than the boiling point of the solvent for a predetermined time. In particular, the temperature may be about 150 to 250° C., particularly about 170 to 230° C., more particularly about 190 to 220° C. In addition, the solvothermal synthesis step may be performed for about 20 to 28 hours, particularly about 22 to 26 hours.

As a result, a sea urchin-shaped $K_2V_3O_8$/reduced graphene oxide composite may be formed, and the $K_2V_3O_8$/reduced graphene oxide composite may include $K_2V_3O_8$ particles affixed or physically bonded to a reduced graphene oxide sheet.

$K_2V_3O_8$ in the composite may have a crystal structure formed of a plurality of vanadium oxide layers with corner-sharing tetragonal-pyramidal $VO_5$ or tetrahedral $VO_4$. The crystal structure is a layered structure wherein the vanadium oxide layers are arranged in a line, and as potassium layers are disposed between vanadium oxide layers, the vanadium oxide layers and the potassium layers are alternately stacked. Here, K may function as a pillar. Accordingly, $K_2V_3O_8$ may have excellent structural stability.

In addition, the reduced graphene oxide in the composite may exhibit very low crystallinity, particularly an amorphous shape. In addition, even when the reduced graphene oxide forms a composite along with $K_2V_3O_8$, the crystal structure of the $K_2V_3O_8$ may not be changed. Further, when the reduced graphene oxide is used to form a composite, electrical conductivity may be improved.

A powder finally obtained by the synthesis method may be washed using an alcohol. The alcohol may be, for example, ethanol. After the washing, drying may be performed through heat treatment in an oven in an air atmosphere.

Zinc Secondary Battery

Figure 3:
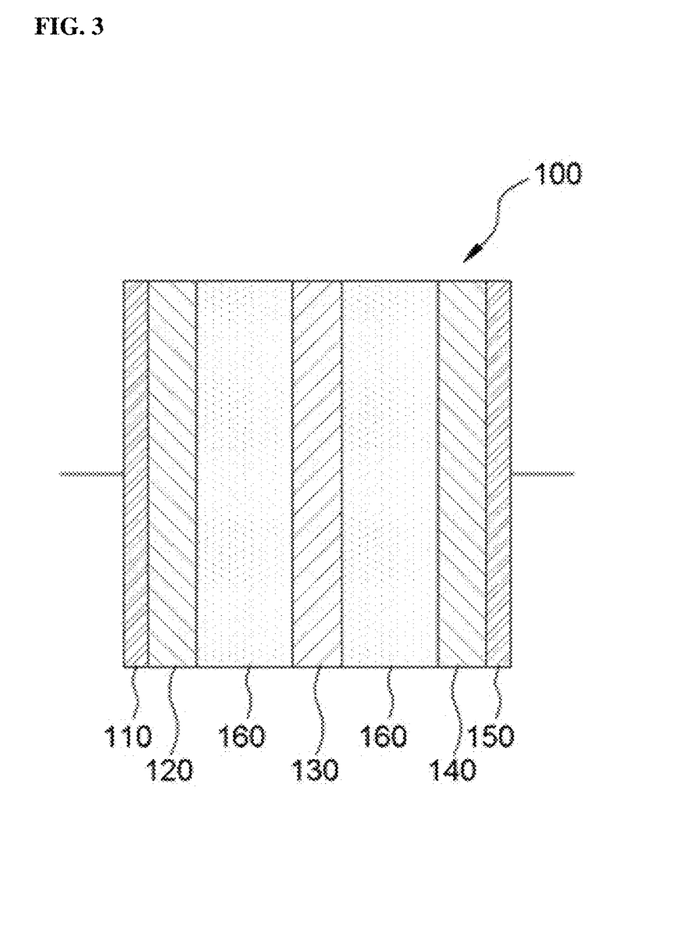
FIG. 3 is a schematic view illustrating a secondary battery according to an embodiment of the present disclosure.

FIG. 3 is a schematic view illustrating a secondary battery according to an embodiment of the present disclosure.

Referring to FIG. 3, a secondary battery 100 includes a first electrode active material layer 140 containing the active material described above, a second electrode active material layer 120 containing a second electrode active material from/into which $zinc^{2+}$ ions are deintercalated/intercalated, and a separator 130 disposed between the first electrode active material layer 140 and the second electrode active material layer 120. An electrolyte 160 may be disposed or filled between the first electrode active material layer 140 and the separator 130 and between the second electrode active material layer 120 and the separator 130. The second electrode active material layer 120 may be disposed on a second electrode current collector 110, and the first electrode active material layer 140 may be disposed on a first electrode current collector 150.

<First Electrode>

A first electrode material may be obtained by mixing the first electrode active material, a conductive material, and a binder.

Here, the conductive material may be a carbon material such as natural graphite, artificial graphite, coke, carbon black, carbon nanotubes, or graphene. The binder may include a thermoplastic resin, for example, a fluorine resin such as polyvinylidene fluoride, polytetrafluoroethylene, tetrafluoroethylene, a vinylidene fluoride-based copolymer, or propylene hexafluoride, and/or a polyolefin resin such as polyethylene or polypropylene.

A first electrode may be formed by coating a first electrode current collector with the first electrode material. The first electrode current collector may be a conductive material such as Al, Ni, or stainless steel. The first electrode current collector may be coated with the first electrode by press molding or using an organic solvent and the like, and a method of coating the first electrode current collector with a prepared paste and pressing and affixing the same may be used. The organic solvent may be an amine such as N,N-dimethylaminopropylamine or diethyltriamine; an ether such as an ethylene oxide or tetrahydrofuran; a ketone such as methyl ethyl ketone; an ester such as methyl acetate; an aprotic polar solvent such as dimethylacetamide or N-methyl-2-pyrrolidone; or the like. The first electrode current collector may be coated with the paste, for example, by a gravure coating method, a slit-die coating method, a knife coating method, or a spray coating method.

<Second Electrode>

The second electrode active material may be formed using a metal, a metal alloy, a metal oxide, a metal fluoride, a metal sulfide, a carbon material such as natural graphite, artificial graphite, coke, carbon black, carbon nanotubes, or graphene, or the like causing a deintercalation/intercalation or conversion reaction of zinc ions.

A second electrode material may be obtained by mixing the second electrode active material, a conductive material, and a binder. Here, the conductive material may be a carbon material such as natural graphite, artificial graphite, coke, carbon black, carbon nanotubes, or graphene. The binder may include a thermoplastic resin, for example, a fluorine resin such as polyvinylidene fluoride, polytetrafluoroethylene, tetrafluoroethylene, a vinylidene fluoride-based copolymer, or propylene hexafluoride, and/or a polyolefin resin such as polyethylene or polypropylene.

A second electrode may be formed by coating a second electrode current collector with the second electrode material. The second electrode current collector may be a conductive material such as Al, Ni, or stainless steel. The second electrode current collector may be coated with the second electrode material by press molding or using an organic solvent and the like, and a method of coating the current collector with a prepared paste and pressing and affixing the same may be used. The organic solvent may be an amine such as N,N-dimethylaminopropylamine or diethyltriamine; an ether such as an ethylene oxide or tetrahydrofuran; a ketone such as methyl ethyl ketone; an ester such as methyl acetate; an aprotic polar solvent such as dimethylacetamide or N-methyl-2-pyrrolidone; or the like. The second electrode current collector may be coated with the paste, for example, by a gravure coating method, a slit-die coating method, a knife coating method, or a spray coating method.

<Electrolyte>

An electrolyte may be a liquid electrolyte including a metal salt and a solvent for dissolving the same. In particular, a zinc salt may be $ZnSO_4$, $Zn(NO_3)_2$, or the like, or a mixture of two or more thereof. In addition, the solvent may be an aqueous solvent or an organic solvent.

However, an electrolyte of the present disclosure is not limited in electrolyte type and may be a polymer-type solid electrolyte prepared by impregnating a polymer with the liquid electrolyte, or a ceramic solid electrolyte. In the polymer-type solid electrolyte, the polymer may be a polyethylene oxide-based polymer compound, a polymer compound including at least one of a polyorganosiloxane chain and a polyoxyalkylene chain, or the like. The ceramic solid electrolyte may be an inorganic ceramic of a sulfide, oxide, phosphate, or the like of a desired metal. A solid electrolyte may serve as a separator described below, and, in some cases, the separator may be unnecessary.

<Separator>

A separator may be disposed between the first electrode and the second electrode. Such a separator may be a porous film, a nonwoven fabric, a woven fabric, or the like made of a material such as a polyolefin resin such as polyethylene or polypropylene, a fluorine resin, or a nitrogen-containing aromatic polymer. The separator preferably has a thin thickness so long as the mechanical strength thereof is maintained because the volume energy density of a battery increases and the internal resistance thereof is decreased with an increasing thickness of the separator.

<Method of Manufacturing Metal Secondary Battery>

The first electrode, the separator, and the second electrode are sequentially laminated to form an electrode group, and then, as needed, the electrode group is rolled up and stored in a battery can. The battery electrode group is impregnated with an electrolyte, thereby manufacturing a zinc secondary battery. Alternatively, the first electrode, a solid electrolyte, and the second electrode are laminated to form an electrode group, and then, as needed, the electrode group is rolled up and stored in a battery can, thereby manufacturing a metal secondary battery.

Hereinafter, the present disclosure will be described in more detail with reference to the following Examples. However, it should be understand that the examples are merely for concretely explaining the spirit of the disclosure and therefore, there is no intent to limit the disclosure to the Examples.

EXAMPLES

Manufacturing Example 1: Preparation of $K_2V_3O_8$/Reduced Graphene Oxide Composite 0.826 g of $V_2O_5$ and 0.265 g of KOH were added to 40 ml of anhydrous ethanol, and then 0.055 g, i.e., 5 wt % based on a total weight of $V_2O_5$ and KOH, of a reduced graphene oxide was added thereto, followed by stirring with a magnetic bar for about 1 hour at room temperature. The stirred mixture was transferred into a Teflon container, and then placed in an autoclave, followed by heat-treating at 200° C. for 24 hours to perform solvothermal synthesis. A material generated after completing the synthesis was slowly cooled to room temperature, and then washed with distilled water and ethanol, followed by drying in a 60° C. oven under vacuum for 24 hours. As a result, a powder was obtained.

Comparative Example 1: Preparation of $K_2V_3O_8$ 0.826 g of $V_2O_5$ and 0.265 g of KOH were added to 40 ml of anhydrous ethanol, followed by stirring with a magnetic bar for about 1 hour at room temperature. The stirred mixture was transferred into a Teflon container, and then placed in an autoclave, followed by heat-treating at 200° C. for 24 hours to perform solvothermal synthesis. A material generated after completing the synthesis was slowly cooled to room temperature, and then washed with distilled water and ethanol, followed by drying in a 60° C. oven under vacuum for 24 hours. As a result, a powder was obtained.

Figure 4A:
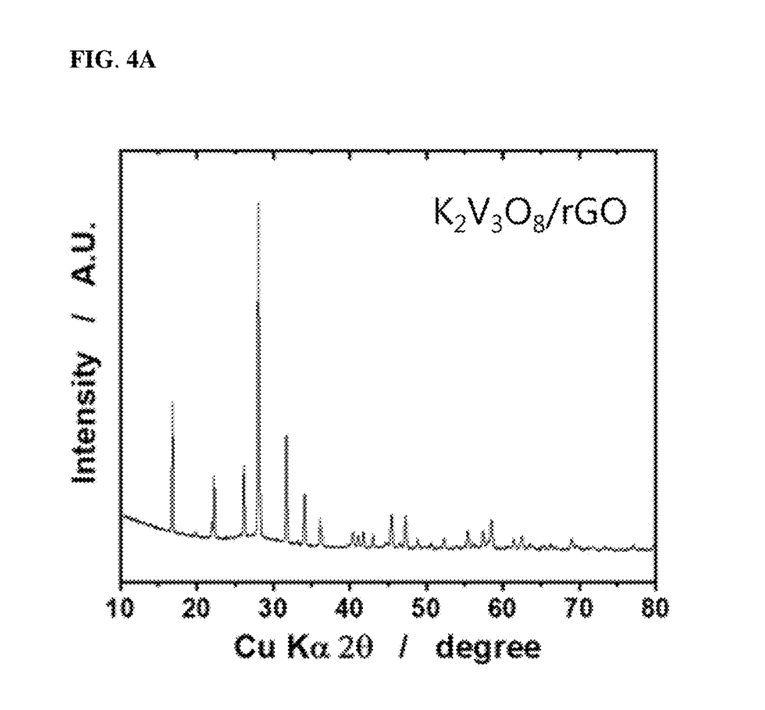
FIGS. 4A and 4B illustrate X-ray diffraction (XRD) analysis results of powders obtained in Manufacturing Example 1 and Comparative Example 1, respectively.
Figure 4B:
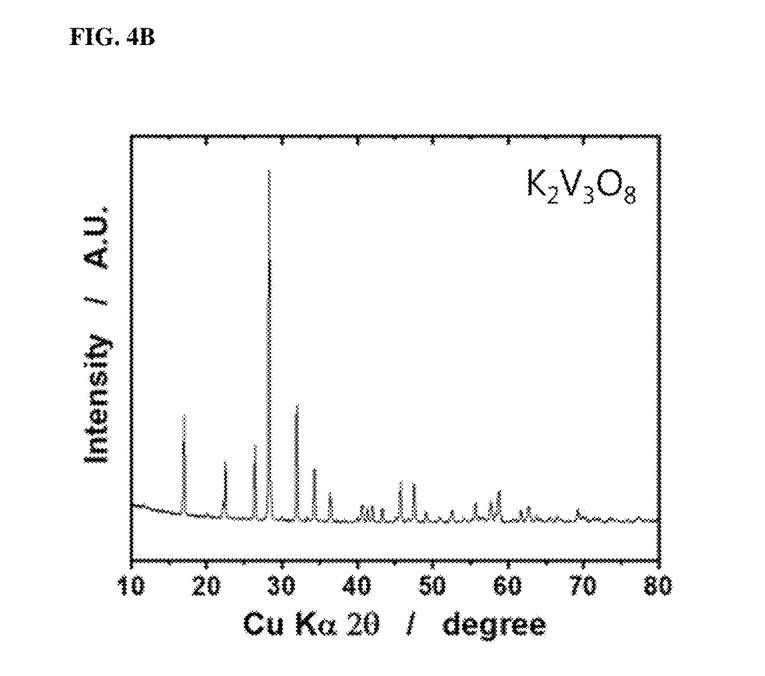

FIGS. 4A and 4B illustrate X-ray diffraction (XRD) analysis results of powders obtained in Manufacturing Example 1 and Comparative Example 1, respectively.

Referring to FIG. 4, the $K_2V_3O_8$/reduced graphene oxide composite according to Manufacturing Example 1 exhibits an XRD pattern consistent with that of $K_2V_3O_8$ according to Comparative Example 1. This result may mean that, even if $K_2V_3O_8$ forms a composite along with the reduced graphene oxide, the crystal structure thereof is not changed. In addition, the result may mean that the XRD pattern of the $K_2V_3O_8$/reduced graphene oxide composite is consistent with the XRD pattern of $K_2V_3O_8$ despite inclusion of the reduced graphene oxide because the crystallinity of the reduced graphene oxide is very low.

In the XRD patterns of the $K_2V_3O_8$/reduced graphene oxide composite and $K_2V_3O_8$, main peaks are observed at 2θ positions of 16.884, 28.127, and 31.787 which are respective peaks for planes 001, 121, and 130. Half widths of these peaks are respectively 0.138, 0.200, and 0.161.

From this result, it can be confirmed that the powders obtained in Manufacturing Example 1 and Comparative Example 1 are $K_2V_3O_8$ having a single-phase crystal and a space group of P4bm and exhibiting excellent crystallinity with almost no impurity peak.

FIGS. 5A and 5B illustrate scanning electron microscopy (SEM) photographs of powders obtained in Manufacturing Example 1 and Comparative Example 1, respectively.

Both the $K_2V_3O_8$ particles in the $K_2V_3O_8$/reduced graphene oxide composite obtained in Manufacturing Example 1, as shown in FIG. 5A, and the $K_2V_3O_8$ particles obtained in Comparative Example 1, as shown in FIG. 5B, have a shape wherein two-dimensional sheets having a nanometer-sized layer thickness are irregularly agglomerated. That is, the $K_2V_3O_8$ particles have a shape wherein two-dimensional sheets are irregularly agglomerated, and surfaces of the agglomerated particles have a sea urchin shape. Accordingly, the $K_2V_3O_8$ nanoparticles may have excellent porosity and a large surface area.

It can be confirmed that, even when the reduced graphene oxide is added to the $K_2V_3O_8$ nanoparticles, the composite particles prepared by the solvothermal synthesis method have a shape wherein the $K_2V_3O_8$ particles and the reduced graphene oxide sheet are irregularly agglomerated, i.e., the shape of the composite particles is not greatly changed.

In particular, the $K_2V_3O_8$/reduced graphene oxide composite may include the reduced graphene oxide sheet in addition to the $K_2V_3O_8$ particles. Here, the $K_2V_3O_8$ particles may be affixed or physically bonded to the reduced graphene oxide sheet. Accordingly, the $K_2V_3O_8$ particles may be directly connected to the reduced graphene oxide, thereby forming high electrical contacts. In addition, the electrical conductivity of a secondary battery including the $K_2V_3O_8$ particles as an active material may be greatly improved.

Manufacturing Example 2: Manufacture of Zinc Ion Half-Cell Provided with Positive Electrode Including $K_2V_3O_8$/Reduced Graphene Oxide Composite The $K_2V_3O_8$/reduced graphene oxide composite powder prepared in Manufacturing Example 1, a conductive material (carbon black), and a binder (polyvinylidene fluoride, PVDF) in a weight ratio of 8:1:1 were mixed with an organic solvent (N-methyl-2-pyrrolidone, NMP), thereby forming a slurry. Next, a stainless steel mesh current collector was coated with the slurry, and then dried at 80° C. overnight under vacuum, thereby forming a positive electrode.

Using the positive electrode, a zinc metal plate as a negative electrode, a glass filter as a separator, and 1 M $Zn(CF_3SO_3)_2$ as an aqueous electrolyte, a 2032-type coin cell, as a zinc ion half-cell, was manufactured.

Comparative Example 2: Manufacture of Zinc Ion Half-Cell Provided with Positive Electrode Including $K_2V_3O_8$ A coin cell, as a zinc ion half-cell, was manufactured in the same manner as in Manufacturing Example 2, except that the $K_2V_3O_8$ powder prepared in Comparative Example 1 was used instead of the $K_2V_3O_8$/reduced graphene oxide composite powder prepared in Manufacturing Example 1.

Evaluation Example 1: Zinc Ion Half-Cell Characteristic Evaluation

Figure 6A:
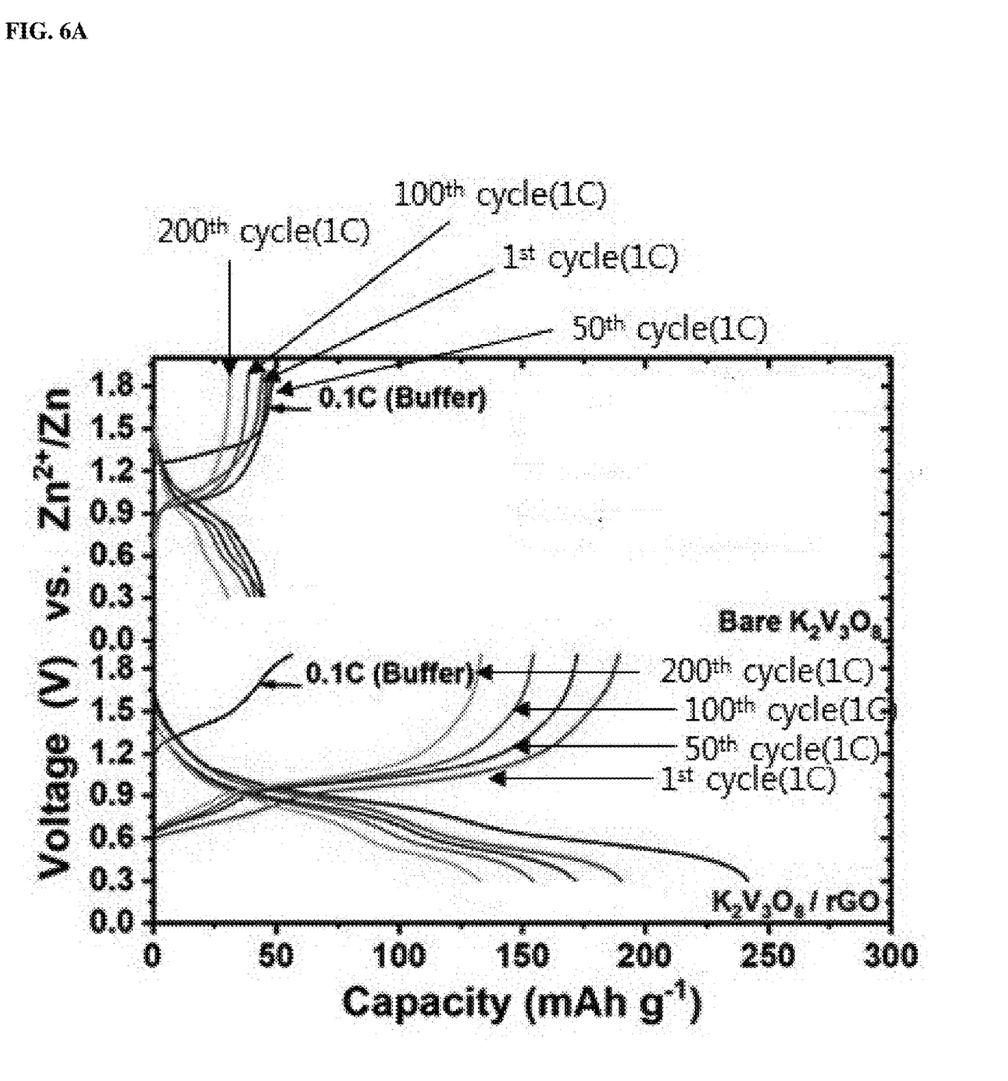
FIGS. 6A and 6B are graphs illustrating charge/discharge characteristics according to cycle number at a 1 C current density of zinc ion half-cells obtained in Manufacturing Example 2 and Comparative Example 2, respectively.
Figure 6B:
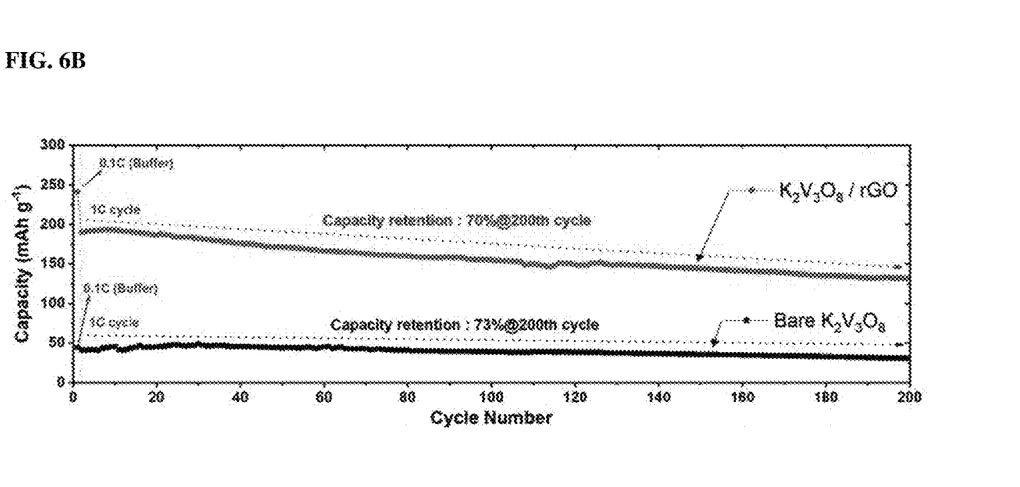

FIGS. 6A and 6B are graphs illustrating charge/discharge characteristics according to cycle number at a 1 C current density of zinc ion half-cells obtained in Manufacturing Example 2 and Comparative Example 2, respectively.

Constant current discharge was performed until 0.3 V, and constant current charge was performed until 1.9 V at the same rate as the rate of the constant current discharge.

Referring to FIGS. 6A and 6B, it can be confirmed that the capacity of the zinc ion half-cell obtained in Comparative Example 2 is about 50 mAh/g, which indicates that the zinc ion half-cell provided with the positive electrode including $K_2V_3O_8$ does not sufficiently perform charging and discharging operations. In addition, it can be confirmed that it is difficult to use $K_2V_3O_8$ alone as an electrode active material.

On the other hand, it can be confirmed that the capacity of the zinc ion half-cell obtained in Manufacturing Example 2 is 50 mAh/g or more regardless of cycle number, and the capacity thereof is slightly decreased with an increasing cycle number. However, it can be confirmed that the capacity of the zinc ion half-cell is not reduced below 50 mAh/g although the cycle number increases.

In addition, it can be confirmed that the zinc ion half-cell obtained according to Manufacturing Example 2 does not exhibit a great decrease in capacity and has a capacity retention rate of 70%, even after 200 cycles.

As such, the $K_2V_3O_8$/reduced graphene oxide composite is applicable to a zinc battery system. In addition, $K_2V_3O_8$ is considered to have structural stability because it maintains a stable layered structure due to formation of the composite even when zinc ions are intercalated/deintercalated, thereby having excellent capacity and high-capacity retention characteristics. In addition, the capacity of $K_2V_3O_8$ is considered to efficiently increase because the reduced graphene oxide having excellent electrical conductivity has been attached thereto.

Figure 7A:
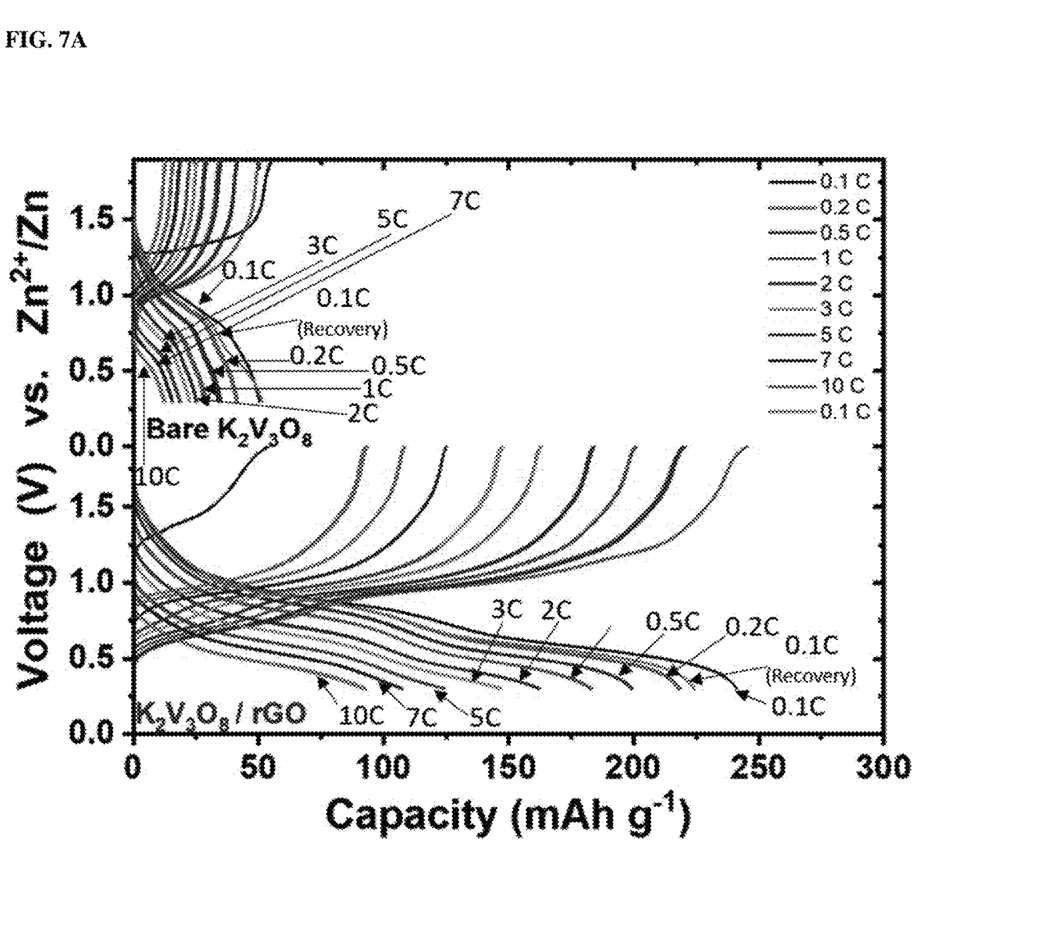
FIGS. 7A and 7B are graphs illustrating capacities in a current density range of 0.1 C to 10 C, i.e., C-rate characteristics, of zinc ion half-cells obtained in Manufacturing Example 2 and Comparative Example 2, respectively.
Figure 7B:
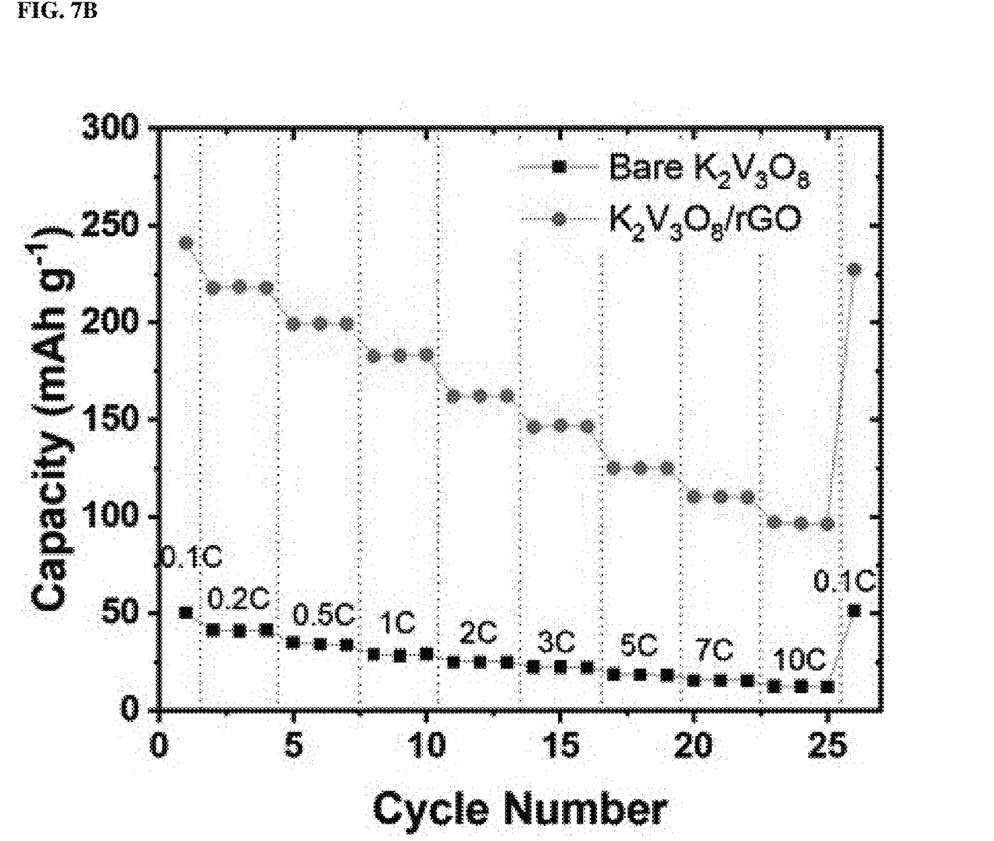

FIGS. 7A and 7B are graphs illustrating capacities in a current density range of 0.1 C to 10 C, i.e., C-rate characteristics, of zinc ion half-cells obtained in Manufacturing Example 2 and Comparative Example 2, respectively.

Constant current discharge was performed until 0.3 V, and constant current charge was performed until 1.9 V at the same rate as the rate of the constant current discharge. Based on 1 C, charging and discharging were performed at 170 mA/g.

Referring to FIGS. 7A and 7B, one cycle of charging and discharging were performed at 0.1 C, and three cycles of charging and discharging were performed at other current densities. From this, charge/discharge capacities in a current density range of 0.1 C to 10 C can be confirmed, and it can be confirmed that the charge/discharge capacity is reduced again with an increasing current density. However, it can be confirmed that the capacity of the zinc ion half-cell obtained in Manufacturing Example 2 is larger than that of the zinc ion half-cell obtained in Comparative Example 2 even at a high current density.

Figure 8:
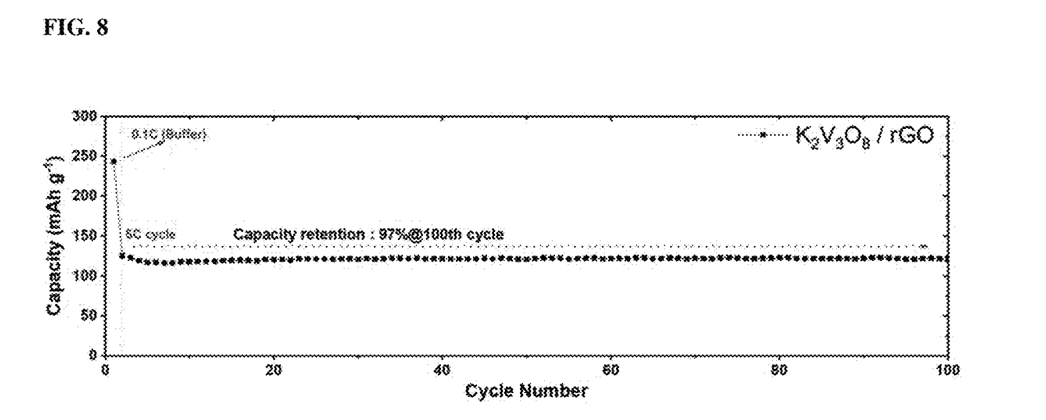
FIG. 8 is a graph illustrating charge/discharge characteristics according to cycle number at a 5 C current density of a zinc ion half-cell obtained in Manufacturing Example 2 of the present disclosure.

FIG. 8 is a graph illustrating charge/discharge characteristics according to cycle number at a 5 C current density of a zinc ion half-cell obtained in Manufacturing Example 2 of the present disclosure.

Referring to FIG. 8, it can be confirmed that, when capacities are measured while performing charging/discharging at a current density of 5 C-rate (850 mA/g), the zinc ion half-cell obtained in Manufacturing Example 2 does not exhibit a great decrease in capacity even after 100 cycles and has a capacity retention rate of 97%.

Accordingly, it can be confirmed that the zinc ion half-cell provided with the positive electrode including the $K_2V_3O_8$/reduced graphene oxide composite has an excellent capacity retention rate, thereby having lifespan stability and high rate characteristics, particularly maintaining excellent performance even at a high current density and electrochemical characteristics even during high-speed charging and discharging. These characteristics are not exhibited in a zinc ion battery system provided with a positive electrode including $K_2V_3O_8$ alone. Accordingly, the characteristics can be considered as results of an increase in electrical conductivity due to the formation of the $K_2V_3O_8$/reduced graphene oxide composite.

As apparent from the above description, a zinc ion battery system including an alkali metal-vanadium oxide/graphene oxide composite, as an electrode active material, according to the present disclosure can exhibit excellent rechargeability and have a high discharge capacity and an excellent capacity retention rate.

Although the present disclosure has been described in detail with reference to the preferred embodiments, those skilled in the art will appreciate that the scope of the present disclosure is not limited to the embodiments and various modifications and changes are possible within the technical spirit and scope of the present disclosure.

DESCRIPTION OF SYMBOLS

100: Secondary battery
110: Second electrode current collector
120: Second electrode active material layer
130: Separator
140: First electrode active material layer
150: First electrode current collector
160: Electrolyte

What is claimed is:

1. A zinc ion secondary battery, comprising:
a first electrode comprising an active material;
a second electrode; and
an electrolyte disposed between the first electrode and the second electrode,
wherein the active material comprised in the first electrode is an alkali metal-vanadium oxide/graphene oxide composite,
wherein the alkali metal-vanadium oxide has a layered crystal structure in which alkali metal ion layers and vanadium oxide layers are alternately stacked,
wherein the alkali metal-vanadium oxide is $K_xV_3O_8$ wherein x is 2 to 2.2, and
wherein zinc ions are intercalated into or deintercalated from empty spaces in the layered crystal structure.

2. The zinc ion secondary battery according to claim 1, wherein the alkali metal-vanadium oxide has a tetragonal crystal structure.

3. The zinc ion secondary battery according to claim 1, wherein the alkali metal-vanadium oxide has a P4bm space group.

4. The zinc ion secondary battery according to claim 1, wherein each of the vanadium oxide layers has corner-sharing tetragonal-pyramidal $VO_5$ and tetrahedral $VO_4$.

5. The zinc ion secondary battery according to claim wherein the $K_xV_3O_8$ is $K_2V_3O_8$.

6. The zinc ion secondary battery according to claim 1, wherein the graphene oxide is a reduced graphene oxide.

7. The zinc ion secondary battery according to claim 1, wherein the alkali metal-vanadium oxide/graphene oxide composite comprises alkali metal-vanadium oxide particles having the alkali metal-vanadium oxide and a graphene oxide sheet for affixing the alkali metal-vanadium oxide particles.

8. An electrode active material, comprising:
alkali metal-vanadium oxide particles; and
a graphene oxide sheet for affixing the alkali metal-vanadium oxide particles,
wherein the alkali metal-vanadium oxide particles have an alkali metal-vanadium oxide including a layered crystal structure in which alkali metal ion layers and vanadium oxide layers are alternately stacked, and
wherein the alkali metal-vanadium oxide is $K_xV_3O_8$ wherein x is 2 to 2.2.

9. The electrode active material according to claim 8, wherein each of the vanadium oxide layers has corner-sharing tetragonal-pyramidal $VO_5$ and tetrahedral $VO_4$.

10. The electrode active material according to claim 8, wherein the graphene oxide is a reduced graphene oxide.

11. A method of preparing the electrode active material of claim 8, the method comprising:
preparing a solution comprising a vanadium oxide, an alkali compound, and a solvent;
adding a reduced graphene oxide to the solution to prepare a mixture; and
performing solvothermal synthesis by feeding the mixture into a closed reactor and heat-treating at a temperature of a boiling point of the solvent or higher.

12. The method according to claim 11, wherein the solvent is an anhydrous alcohol.

13. The method according to claim 12, wherein the anhydrous alcohol is anhydrous ethanol.

14. The method according to claim 11, wherein the solvothermal synthesis is performed at 170 to 230° C.

15. The method according to claim 11, wherein the solvothermal synthesis is performed for 22 to 26 hours.

* * * * *